(12) United States Patent
Chen et al.

(10) Patent No.: US 6,244,098 B1
(45) Date of Patent: *Jun. 12, 2001

(54) METHODS AND APPARATUS FOR MONITORING WATER PROCESS EQUIPMENT

(75) Inventors: Haiwen Chen, Holland; Paul R. Burgmayer, Wayne, both of PA (US); Ke Hong, Kendall Park, NJ (US)

(73) Assignee: Betzdearborn Inc., Trevose, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/047,602

(22) Filed: Mar. 25, 1998

Related U.S. Application Data

(63) Continuation-in-part of application No. 08/938,419, filed on Sep. 26, 1997, which is a continuation-in-part of application No. 08/800,110, filed on Feb. 13, 1997, now Pat. No. 5,756,880.

(51) Int. Cl.[7] .................................................. G01M 3/08
(52) U.S. Cl. .................................................. 73/40
(58) Field of Search ........................ 73/195–197, 77–79, 73/81, 40

(56) References Cited

U.S. PATENT DOCUMENTS

| 3,447,895 | 6/1969 | Nelson et al. . |
| 3,994,174 | 11/1976 | Ekman . |
| 4,242,989 * | 1/1981 | Chamberlain .................... 122/451 R |
| 4,428,328 | 1/1984 | Ratliff . |
| 4,462,319 | 7/1984 | Larsen .................................. 110/238 |
| 4,497,283 * | 2/1985 | LaSpisa et al. ................... 122/451.1 |
| 4,498,333 | 2/1985 | Parthasarathy .................... 73/40.5 A |

(List continued on next page.)

OTHER PUBLICATIONS

"Black Liquor Recovery Boiler Advisory Committee Recommended Emergency Shutdown Procedure (ESP) and Procedure for Testing ESP System for Black Liquor Recovery Boilers", BLRBAC, Oct. 1993.

Buckner et al., "Design and Implementation of a Commercial Acoustic Leak–Detection System for Black Liquor Recovery Boilers", TAPPI Journal, 121, Jul., 1990.

Boyette et al., "An Automated Coordinated Phosphate/pH Controller for Industrial Boilers", Presented at NACE Corrosion '95, Mar., 1995.

Gommi, "Status of Leak Detection Methods for Recovery Units in North America", *TAPPI Journal*, vol. 81, No. 10, pp. 69–75 (Oct. 1998).

(List continued on next page.)

*Primary Examiner*—Hezron Williams
*Assistant Examiner*—Jay L. Politzer
(74) *Attorney, Agent, or Firm*—Greenblum & Bernstein, P.L.C.

(57) ABSTRACT

Methods and apparatus are provided for detection of leaks in boilers containing a temperature control liquid which is supplemented with feedwater and removed as blowdown, main steam and sootblower steam. In a preferred embodiment, the boiler has an automatic liquid level control mechanism. The methods include measuring rates associated with feedwater supplementation and removal, correcting for the offsets between the supplementation and removal rates, determining the unaccounted for water rate, and comparing the unaccounted for water rate with zero to determine if a leak condition is present.

18 Claims, 1 Drawing Sheet

U.S. PATENT DOCUMENTS

| | | | |
|---|---|---|---|
| 4,502,322 | 3/1985 | Tero | 73/40.5 A |
| 4,777,009 | 10/1988 | Singh et al. . | |
| 4,783,314 | 11/1988 | Hoots et al. | 422/3 |
| 4,963,229 | 10/1990 | Lisnyansky et al. . | |
| 4,966,711 | 10/1990 | Hoots et al. | 210/697 |
| 5,041,386 | 8/1991 | Pierce et al. | 436/50 |
| 5,148,775 | 9/1992 | Peet | 122/451 R |
| 5,304,800 | 4/1994 | Hoots et al. | 250/302 |
| 5,320,967 | 6/1994 | Avallone et al. | 436/50 |
| 5,363,693 | 11/1994 | Nevruz | 73/40.5 R |
| 5,411,889 | 5/1995 | Hoots et al. | 436/6 |
| 5,416,323 | 5/1995 | Hoots et al. . | |
| 5,565,619 | 10/1996 | Thungstrom et al. | 73/40.7 |
| 5,648,605 * | 7/1997 | Takahashi | 73/197 |
| 5,663,489 | 9/1997 | Thungstrom et al. . | |
| 5,696,696 | 12/1997 | Gunther et al. | 364/500 |
| 5,756,880 | 5/1998 | Chen et al. . | |
| 5,817,927 | 10/1998 | Chen et al. . | |
| 5,847,266 | 12/1998 | Nevruz . | |
| 5,923,571 | 7/1999 | Gunther et al. . | |

OTHER PUBLICATIONS

Dockter et al., "Software Based Method for Tube Leak Detection Provides Reliable Warning Quickly", *1997 Engineering & Papermakers Conference*, pp. 585–588 (1997).

Durham et al., "Black Liquor Recovery Boiler Leak Detection: Indication of Boiler Water Loss Using a Waterside Mass Balance Method", Presented at TAPPI '95, in Sep. 1995.

Clevett, K. J., Process Analyzer Technology, John Wiley & Sons, New York, 1986, 872–876.

Grace, T. M., "Acoustic Leak Detection—One Answer to a Need", PIMA, 53, Dec., 1988.

Racine et al., "An Expert System for Detecting Leaks in Recovery—Boiler Tubes", TAPPI Journal, 147, Jun., 1992.

Hoefs et al., "Using Inert Waterside Tracers as Part of an Overall Black Liquor Recovery Boiler Leak Indication Strategy", Sep. 1996 Gulf Coast TAPPI Meeting.

* cited by examiner

METHODS AND APPARATUS FOR MONITORING WATER PROCESS EQUIPMENT

This application is a continuation-in-part of Ser. No. 08/938,419 filed Sep. 26, 1997, which is a continuation-in-part of Ser. No. 08/800,110, filed Feb. 13, 1997 U.S. Pat. No. 5,756,880.

FIELD OF THE INVENTION

The present invention is directed to methods and apparatus for monitoring industrial water process equipment. More particularly, the invention is directed to the detection of leaks in water process equipment such as black liquor recover boilers.

BACKGROUND OF THE INVENTION

A boiler is an apparatus in which water or some other aqueous temperature control liquid to which makeup water is added and from which blowdown is removed is vaporized into steam by the application of heat from a furnace or heat-generating process system. In most instances, the temperature control liquid is brought into close, indirect contact with the process system to facilitate heat transfer. Leakage in a boiler can result not only in contamination and fouling of the temperature control liquid and the process system, but also in undesired physical reactions. This is particularly true for the black liquor recovery boilers used in many paper mills. In black liquor recovery boilers, the escape or leakage of aqueous temperature control liquid from the so-called "water side" of the boiler into the hot, highly caustic "fire side" can result in violent explosions.

The prior art provides numerous techniques for monitoring and controlling leaks in black liquor recovery boilers and other boiler systems. For example, U.S. Pat. No. 5,320,967 (Avallone, et al.) discloses a boiler system leak detection method that involves introducing an inert tracer to the boiler in a known and uniform proportion to the feedwater, sensing a characteristic of the tracer in the boiler at steady state, converting the sensed characteristic to a value equivalent to the concentration of the tracer in the temperature control liquid, and activating a signal when there is excessive variance in the concentration of the tracer. However, the method disclosed by Avallone, et al. is limited by its requirement that the tracer be detected (sensed) when the boiler is at steady state, which is said to occur only when there is no significant change in any of five process parameters: the concentration of the tracer in the boiler; the blowdown rate; the feedwater rate; the rate of feeding tracer to the boiler; and the steaming rate in the absence of boiler leakage.

Further limitations include the costs of tracer chemicals and measuring equipment for both inputting tracer chemicals and for analyzing blowdown.

U.S. Pat. No. 5,363,693, Nevruz, teaches methods and apparatus for detecting leakage from chemical recovery boiler systems. The methods utilize measuring the mass input and output of a recovery boiler and calculating the long and short term statistics for the drum balance of mass flow. From these calculations a t-test function is calculated to see if both long term and short term moving average of drum balances are significantly different, which in turn indicates whether a boiler leak is occurring. Although this method provides corrections to sensor input caused by flow sensor drift and offset, it still suffers from serious offsets in the leak detection signal during changes in process parameters, namely steaming rate changes.

Consequently, there remains a need in the art for more flexible leak detection methods which can be employed in boiler systems that are not at steady state, that is, where one or more process parameters is subject to change.

SUMMARY OF THE INVENTION

The present invention provides for methods and apparatus for the detection of leaks in boilers to which a temperature control liquid is added and from which liquid is removed. In a preferred embodiment, the temperature control liquid is supplemented with feedwater and this rate of supplementation is measured. The temperature control liquid is also removed as blowdown, main steam and sootblower steam, and these rates of removal are also measured. The relationship between the water input rate and the water output rate is determined based upon the rates of supplementation and removal. In those boilers having attemperators, this supplementation will include both addition from the attemperator and the feedwater.

The offsets between the water input and output rates is determined and corrected for. As such, the unaccounted for water rate can be determined utilizing the known quantities of supplementation and removal. A comparison of this derived amount with zero (i.e. the unaccounted for water rate is greater than 0) indicates that a leak condition is present in the boiler.

BRIEF DESCRIPTION OF THE DRAWINGS

The accompanying

DETAILED DESCRIPTION OF THE INVENTION

Figure 1:
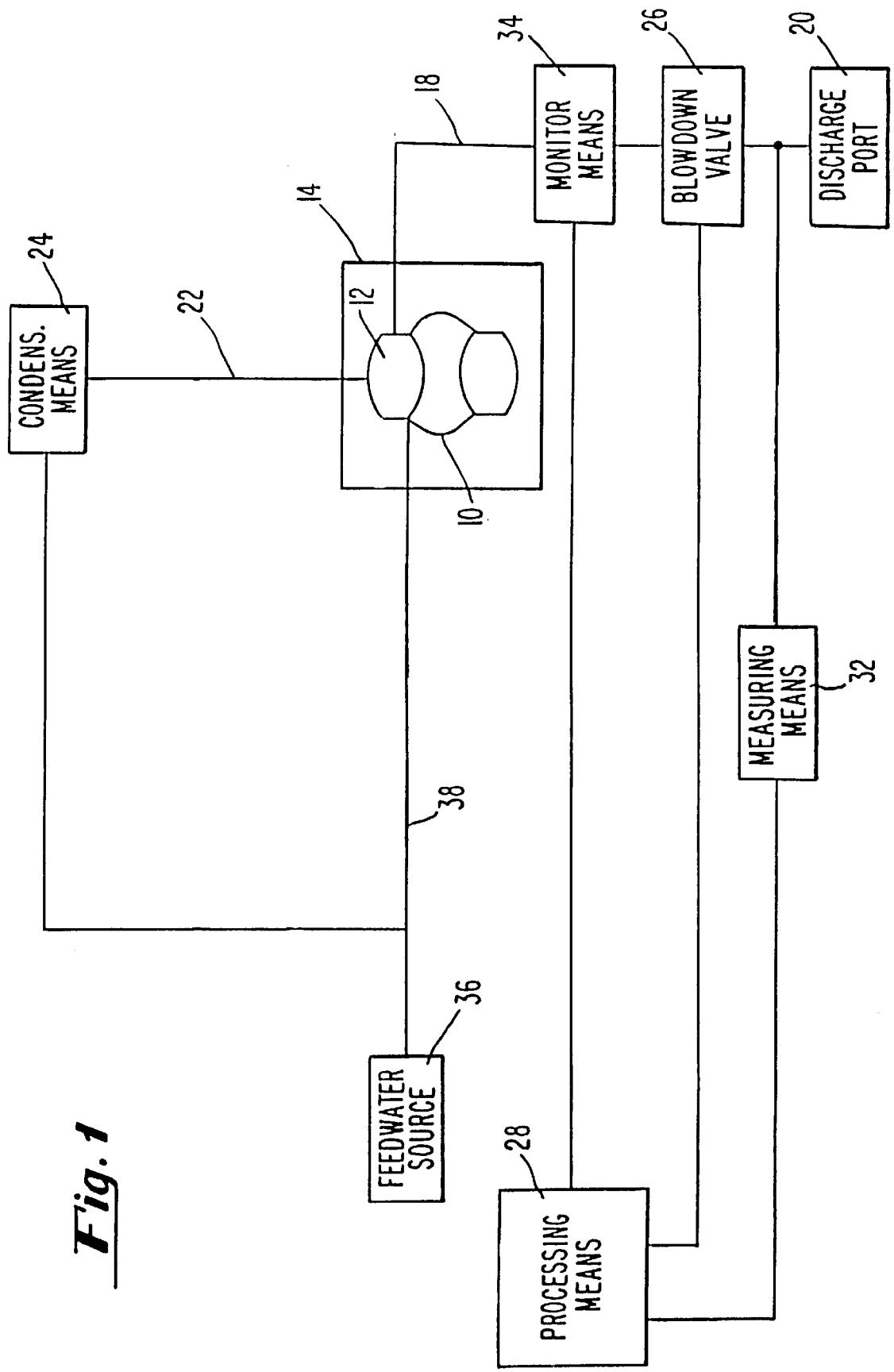
FIG. 1 is a schematic representation of a boiler monitoring system according to the invention.

The present invention provides for methods and apparatus for detecting a leak in a boiler having an automatic liquid level control mechanism in which a temperature control liquid in a containment means is supplemented with feedwater and is removed as blowdown, main steam, and sootblower steam comprising the steps of:

a) measuring a rate associated with said feedwater supplementation to obtain data;

b) measuring a rate associated with said blowdown, main steam, and sootblower steam removal to obtain data;

c) correcting for the offsets between said supplementation means and said removal means;

d) determining the unaccounted for water rate from the data obtained in steps (a), (b) and (c);

e) comparing said unaccounted for water rate with zero;

f) indicating a leak condition if said unaccounted for water rate is greater than zero.

The present invention also provides an apparatus suitable for indicating leaks in boilers. Apparatus according to the invention comprise: measuring means in communication with feedwater supplementation means; measuring means in contact with blowdown, sootblower steam and main steam removal means; correction means for determining the offsets between the water input rate and the water output rate based upon the rates of supplementation and removal; and derivation means in communication with the measuring means for deriving the unaccounted for water rate; and comparison means to determine if a leak condition exists.

The methods and apparatus of the present invention can be used to monitor virtually any type of equipment to which liquid is added and from which liquid is removed and uses an automatic water level control mechanism. The methods and apparatus of the invention preferably are used to monitor and detect leaks in boilers, especially black liquor recovery boilers. Representative boilers are disclosed by U.S. Pat. No. 3,447,895, Nelson et al.; U.S. Pat. No. 4,462,319, Larson; U.S. Pat. No. 4,498,333, Parthasarathy; and U.S. Pat. No. 4,502,322, Tero, the contents of which are incorporated herein by reference.

An exemplary monitoring system according to the invention is shown in FIG. 1, wherein a first "water side" containment means a "boiler" 10 containing temperature control liquid 12 is adjacent to and in thermal communication with a second "fire side" containment means 14 that typically contains hot vapors and a molten smelt bed. Boiler 10 is in fluid communication with blowdown line 18 for the discharge of blowdown to discharge port 20 and with steam line 22 for the discharge of steam to condensation means 24. The discharge of blowdown is controlled through actuation of blowdown value 26, which can be operated manually or under the control of an external computer or some other processing means (not shown). It is not necessary that the blowdown valve be under control of or monitored by the system of the invention. Between boiler 10 and valve 26, blowdown line 18 is in fluid communication with monitoring means 34 to provide information on the blowdown flow rate. Measuring means 32 and 34, in turn, are in electrical communication with processing means 28. Boiler 10 is also in fluid communication with feedwater source 36 via feed line 38.

During normal operation, the controlled addition of feedwater to boiler 10 compensates for the removal of blowdown and steam, and maintains a desired volume of temperature control liquid 12 within boiler 10. A natural consequence of steam generation in a boiler is a concentrating of incoming, non-volatile components. To control this "cycling up" effect, one or more volumes of the relatively-concentrated temperature control liquid typically are removed from the boiler as blowdown and corresponding volumes of relatively-dilute feedwater is added. In accordance with the present invention, the blowdown is measured at regular or irregular intervals or is continuously monitored to determine the weight of water removed as blowdown.

The methods of the present invention are particularly effective for those containment means having an automatic water level control mechanism. These mechanisms are found in boilers and function by way of sensing a change in the amount of volume of water present in the boiler. As water exits the boiler, the sensor indicates that the water level has dropped and signals such so that it may be automatically replenished.

In boiler systems having an automatic water level control mechanism, coefficients a, b and c can be calculated using a least squares fit on historical boiler data. This "historical" data can be that gathered for roughly one month prior to applying the methods and apparatus of the present invention. The least squares fitting is a widely used mechanism for extracting meaning from a set of related observations. In the instance of a boiler, a, b and c can be calculated from an observation and gathering of liquid flow data into and out of the boiler using a least squares fit mechanism. This gathering of data also fits with the steps of the present invention as to the various rates measured. The coefficients a, b and c are particular to each boiler and will even vary from different boilers of the same model and manufacture.

The fundamental equation for water mass balance in a containment means, such as a boiler, is:

$$\frac{dM}{dt} = I - O - U \qquad (1)$$

where:

M=Water mass contained

I=Water input rate (as feedwater)

O=Water output rate (as blowdown, main steam and sootblower steam)

U=Unaccounted water rate (as leak)

t=Time

In an ideal situation, if water mass contained is not changed and there is no unaccounted water rate (dM/dt and U both equal zero), then the water input rate should equal the water output rate (I=O). However, due to calibration mismatch between meters, the relationship between I and O is generally in the form of $$I = a*O + c \qquad (2)$$

where a and c are determinable constants or boiler dependent parameters. The importance of a and c is to correct the calibration mismatch while avoiding having to perform traditional calibration techniques. Instead of calibrating each individual meter periodically, the easier task of recalculating a and c need only be performed.

Incorporating these terms into the calculation, the water mass balance equation is $$\frac{dM}{dt} = I - a*O - c - U \qquad (3)$$

Since I and O are measurable, to calculate U, dM/dt must be calculated. In boiler systems having an automatic water level control mechanism, by observation, dM/dt is proportional to dl/dt, or $$dM/dt = b*dl/dt \qquad (4)$$

where b is a determinable constant, like a and c, which can be calculated using a least square fit on historical boiler data, for example, one month's worth of data. The importance of the b term in computing dM/dt is in eliminating the time lag between the input (I) and the output (O).

Combining equations (3) and (4) yields the following relationships:

$$U = I - a*O - b*\frac{dI}{dt} - c \qquad (5)$$

If the unaccounted water rate (U) is greater than zero (within a statistically-significant variance), a leak condition is indicated. Thus if U is a positive number, then the boiler operator initiates an investigation into the possible causes. This typically involves physical and/or acoustical examination of the boiler and, depending on the magnitude of the variance, complete shutdown of the boiler.

Mathematically, V(i), the value of any variable V at the ith data point, can be written as:

$$V(i) = V(i-1) + (V(i) - V(i-1)) = V(i-1) + 1 * \frac{dV(i)}{dt} \Delta t \quad (6)$$

Similarly $$V(i) = V(i-2) + (V(i) - V(i-1)) + (V(i-1) - V(i-2)) \approx V(i-2) + 2*dV(i)*\Delta \text{Etc.} \quad (7)$$

In General, $$V(i) \approx V(i-n) + n * \frac{dV}{dt} * \Delta t$$

setting b=n*Δt
n=b/Δt so $$V(i) \approx V(i - (b/\Delta t)) + b * \frac{dV(i)}{dt} \quad (8)$$

or $$V(i) - (b/\Delta t)\frac{dV(i)}{dt} \approx V(i-b) \quad (9)$$

Thus, Formula (5) at iteration (i) becomes $$U(i) = I(i - (b/\Delta t)) - a*O(i) - c \quad (10)$$

The term from equation (5), $$b * \frac{dI}{dt},$$

is designed to eliminate the time lag between the Input Rate (I) and the Output Rate(O). By applying formula (9) to this term and equation, an improved means for calculating and determining the presence of a leak is realized. This improvement greatly increases the signal to noise ratio in detecting leaks. Thus, correction for the offsets can be for the time index and/or the magnitude of flow signals.

The improvement can be determined by the following calculations. To simplify the calculation, there are five assumptions: 1) no leak is present; 2) without load swing, both input (I) and output (O) are random variables and they are not correlated; 3) both I and O have same noise level, i.e., both their Stdev=σ; 4) since a is close to 1, a is presumed as 1; and 5) c is 0 since it will not affect noise level.

Accordingly, statistically, Formula (5) can be written as:

$$\text{Noise } 1(i) = I(i) - O(i) - b*(I(i) - I(i-1)) = (1-b)*I(i) + b*I(i-1) - O(i) \quad (11)$$

and Formula (10) as $$\text{Noise } 2(i) = I(i-b) - O(i) \quad (12)$$

By the above stated assumptions and standard calculations:

$$\sigma_{Noise\ 1} = \sqrt{(1-b)^2 \sigma^2 + b^2 \sigma^2} + \sigma^2 = \sqrt{2 - 2*b + 2*b^2} * \sigma = \sqrt{1 - b + b^2} * \sqrt{2} * \sigma \quad (13)$$

and $$\sigma_{Noise\ 2} = \sqrt{\sigma^2 + \sigma^2} = \sqrt{2} * \sigma \quad (14)$$

This means that $\sigma_{Noise\ 1}$ is about the size of $\sqrt{1-b+b^2}$ times $\sigma_{Noise\ 2}$. A typical value for b is −3. As such, $\sigma_{Noise\ 1}$ is about the size of 3.5 $\sigma_{Noise\ 2}$.

At run time, since future data cannot be used and b is usually not an integer, Formula (10) is modified to:

$$U(\text{now}) = \alpha*I(\text{Now}) + \beta*I(\text{Now}-1) - a*O(\text{Now}-\gamma) - C \quad (15)$$

where:

β=b−Floor(b)
α=1−β
γ=abs (Floor(b))
So if b=−3.7, then
β=b−Floor(b)=−3.7−Floor (−3.7)=−3.7−(−4)=0.3
α=1−β=1−0.3=0.7 and
γ=abs (Floor(b))=abs (Floor (−3.7))=abs (−4)=4

EXAMPLES

Data was gathered at a northeastern industrial boiler over a 50 hour period. During this period, feed water rate, steam rate and blowdown were measured.

Using a least squares fitting of the historical data gathered before this 50-hour period, the steam load swing parameter, b, and the parameters for flowmeter calibration mismatch, a and c, were calculated. These values were: a=0.89, b=−4, and c=2. In view of the preceding discussion, b can be negative such that the water output rate is corrected to lag the water input rate.

When employing equation (1), the severe load swing of this boiler made it appear that at the time of the load swing that a leak was present. However, after the load swing, the use of equation (1) indicated that the apparent "leak" had disappeared. Application of the above detailed methods with the calculated boiler-dependent parameters, a, b and c, indicated no leak was present. The methods of the present invention provided greater accuracy than the traditional approach.

While this invention has been described with respect to particular embodiments thereof, it is apparent that numerous other forms and modification of this invention will be obvious to those skilled in the art. The appended claims and this invention generally should be construed to cover all such obvious forms and modifications which are within the true spirit and scope of the present invention.

Having thus described the invention, what we claim is:

1. A method for detecting a leak in a boiler having an automatic liquid level control mechanism in which a temperature control liquid in a containment means is supplemented with feedwater and is removed as blowdown, main steam and sootblower steam comprising:

a) measuring a rate associated with said feedwater supplementation to obtain data;

b) measuring a rate associated with said blowdown, main steam, and sootblower steam removal to obtain data;

c) determining time and flowmeter reading offsets between feedwater supplementation means and removal means;

d) determining an unaccounted for water rate according to the formula:

$$U(i) = I(i - (b/\Delta t)) - a*O(i) - c$$

where:
 U=unaccounted for water rate;
 i=time index;
 t=time;
 I=water input rate;

b=a determinable constant;
a=a determinable constant;
O=water output rate; and
c=a determinable constant;

e) comparing said unaccounted for water rate with zero; and f) indicating a leak condition if said unaccounted for water rate is greater than zero.

2. The method as claimed in claim 1 wherein said rate in steps (a) and (b) is in weight per time unit.

3. The method as claimed in claim 1 wherein said boiler is a black liquor recovery boiler.

4. The method as claimed in claim 1 wherein said leak condition is indicated by electronic means.

5. The method as claimed in claim 1 wherein said measurements in steps (a) and (b) are by flow meters.

6. The method as claimed in claim 1 wherein said determinations in steps (c), (d) (e) are made by a computer.

7. The method as claimed in claim 1 wherein said offsets determination is for the time index or the magnitude of flowmeter reading.

8. The method as claimed in claim 1 wherein b is adjusted to the time index.

9. The method as claimed in claim 1 further comprising physically analyzing said boiler in response to a positive difference between said unaccounted for water rate and zero.

10. A system for detecting a leak in a boiler having an automatic liquid control level mechanism in which a temperature control liquid in a containment means is supplemented with feedwater and is removed as blowdown, main steam and sootblower steam, said system comprising:

measuring means in communication with feedwater supplementation means for measuring the rate associated with said feedwater supplementation;

measuring means in communication with said containment means for monitoring a rate associated with said blowdown, main steam and sootblower steam removal by removal means;

correction means in communication with said feedwater supplementation means and said removal means to determine time and flowmeter reading offsets between water input rate and water output rate to correct for calibration mismatch and time lag;

determination means in communication with said feedwater supplementation means, said removal means, and said correction means for determining the unaccounted for water rate; and comparison means in communication with said unaccounted for water rate determination means for comparing said rate determination means with zero.

11. The system as claimed in claim 10 wherein said measuring means are in electrical communication with said feedwater supplementation means and said containment means.

12. The system as claimed in claim 10 wherein said determination means comprise a computer.

13. The system as claimed in claim 10 wherein said comparison means comprise a computer.

14. An improved method for detecting a leak in a steam generating system having an automatic liquid level control mechanism in which a temperature control liquid in a containment means is supplemented with feedwater and is removed as blowdown, main steam, and sootblower steam, the improvement comprising correcting for offsets which comprises correcting for calibration mismatch and time lag between feedwater supplementation means and removal means.

15. The method as claimed in claim 1, wherein b is negative.

16. The system as claimed in claim 10, wherein the water output rate is corrected to lag the water input rate.

17. The system as claimed in claim 14, wherein a rate of blowdown, main steam, and sootblower steam is corrected to lag a rate of the feedwater.

18. The method as claimed in claim 1, wherein determining the unaccounted for water rate comprises a correcting for calibration mismatch and time lag.

* * * * *